US012359502B2

(12) United States Patent
Chen

(10) Patent No.: US 12,359,502 B2
(45) Date of Patent: Jul. 15, 2025

(54) LADDER ROPE RETAINING DEVICE FOR VENETIAN BLIND

(71) Applicant: SHEEN WORLD TECHNOLOGY CORPORATION, Taichung (TW)

(72) Inventor: Po-Yu Chen, Taichung (TW)

(73) Assignee: SHEEN WORLD TECHNOLOGY CORPORATION, Taichung (TW)

( * ) Notice: Subject to any disclaimer, the term of this patent is extended or adjusted under 35 U.S.C. 154(b) by 301 days.

(21) Appl. No.: 17/752,290

(22) Filed: May 24, 2022

(65) Prior Publication Data

US 2023/0383593 A1 Nov. 30, 2023

(51) Int. Cl.
*E06B 9/307* (2006.01)
*E06B 9/266* (2006.01)

(52) U.S. Cl.
CPC .............. *E06B 9/307* (2013.01); *E06B 9/266* (2013.01)

(58) Field of Classification Search
CPC .......... E06B 9/304; E06B 9/305; E06B 9/306; E06B 9/307; E06B 9/266; E06B 9/26
See application file for complete search history.

(56) References Cited

U.S. PATENT DOCUMENTS 2,218,508 A * 10/1940 Gentile .................. E06B 9/304 160/175
4,662,421 A * 5/1987 Basmadji .................. E06B 9/38 160/39
4,825,529 A * 5/1989 Sawada .................. E06B 3/982 D8/382
5,238,043 A * 8/1993 Woodring .............. E06B 9/307 160/175
6,279,642 B1 * 8/2001 Liu ........................ E06B 9/382 160/176.1 R
10,035,232 B2 * 7/2018 Yagami ............. B23Q 11/0816
2003/0168185 A1 * 9/2003 Wen ........................ E06B 9/304 160/168.1 P
2007/0181266 A1 * 8/2007 Wen ........................ E06B 9/323 160/177 R
2008/0035280 A1 * 2/2008 Lin ........................ E06B 9/307 160/176.1 R
2008/0083513 A1 * 4/2008 Chen ...................... E06B 9/307 160/177 R
2008/0099161 A1 * 5/2008 Liu ........................ E06B 9/307 160/177 R
(Continued)

*Primary Examiner* — Daniel P Cahn
*Assistant Examiner* — Matthew R. Shepherd
(74) *Attorney, Agent, or Firm* — FISHERBROYLES, LLP; Roger L. Browdy; James E. Mrose

(57) ABSTRACT

A ladder rope retaining device includes a support base, a rotating base, and an elastic positioning member. The support base has a bottom wall and two opposite straight walls connected with the bottom wall and each having a pivot trough. The rotating base includes a pivot pivotally disposed in the pivot troughs, and a ladder rope retaining portion formed on the pivot. The pivot has a plurality of positioning recesses arranged in an equally-spaced manner. The elastic positioning member is disposed to one of the straight walls of the support base and elastically engaged with one of the positioning recesses of the pivot. Thus, when the rotating base is rotated relative to the support base, the positioning recesses are alternately engaged with and disengaged from the elastic positioning member to generate a better operating feel.

6 Claims, 6 Drawing Sheets

(56) References Cited

U.S. PATENT DOCUMENTS

| | | | | |
|---|---|---|---|---|
| 2010/0236151 | A1 * | 9/2010 | Chung | G06F 1/181<br>49/319 |
| 2018/0274290 | A1 * | 9/2018 | Chen | E06B 9/306 |
| 2023/0383593 | A1 * | 11/2023 | Chen | E06B 9/307 |

* cited by examiner

LADDER ROPE RETAINING DEVICE FOR VENETIAN BLIND

BACKGROUND OF TILE INVENTION

1. Field of the Invention

The present invention relates to a venetian blind and more particularly, to a ladder rope retaining device for a venetian blind.

2. Description of the Related Art

As far as a venetian blind is concerned, when all slats are lowered, they are adapted to be driven by a ladder rope to tile relative to a headrail for providing a light-blocking effect. To go a step further, the top end of the ladder rope is fixed to a rotating base. When the rotating base is driven by a driving shaft to rotate relative to a support base, the ladder rope is driven synchronously by the rotating base, such that all slats are driven by the ladder rope to tilt relative to the headrail. However, the conventional rotating base is rotated relative to the support base in a smooth manner. This will cause a poor operating feel during adjusting angle of the slats.

SUMMARY OF THE INVENTION

It is a primary objective of the present invention to provide a ladder rope retaining device for a venetian blind, which has a clear operating feel during operation.

To attain the above objective, the ladder rope retaining device of the present invention comprises a support base, a rotating base, and an elastic positioning member. The support base includes a bottom wall and two straight walls connected with two opposite sides of the bottom wall and each having a pivot trough. The rotating base includes a pivot pivotally disposed in the pivot troughs of the support base and a ladder rope retaining portion formed on the outer surface of the pivot. The outer surface of the pivot has a plurality of the positioning recesses arranged in an equally-spaced manner. The elastic positioning member is disposed to one of the straight walls of the support base and elastically engaged with one of the positioning recesses of the pivot of the rotating base.

It can be seen from the above that when the rotating base is rotated relative to the support base, the positioning recesses are alternately engaged with and disengaged from the elastic positioning member. In this way, the ladder rope retaining device of the present invention has a clear operating feel during operation.

Preferably, the top edge of one of the straight walls of the support base includes two insertion grooves located at two opposite sides of the pivot trough. The elastic positioning member has a positioning portion elastically engaged with one of the positioning recesses, two beveled support portions provided with one ends connected with the positioning portion, two extending portions provided with one ends connected with the other ends of the beveled support portions, and two insertion portions connected with the other ends of the extending portions and detachably inserted into the insertion grooves of one of the straight walls of the support base. By this way, the elastic positioning member applies an elastic force to the pivot through the positioning portion.

Preferably, the pivot has a shaft portion pivotally disposed in the pivot troughs of the support base and provided with the positioning recesses, and two disk portions connected with two ends of the shaft portion and located at the outside of the straight walls of the support wall. The diameters of the disk portions are greater than the diameter of the shaft portion and the diameters of the pivot troughs, such that the pivot can be prevented from separating from the pivot troughs along its axial direction.

Preferably, one of the straight walls of the support base includes a receiving hole. The elastic positioning member includes a ball partially protruding out of the receiving hole and engaged with one of the positioning recesses of the pivot, and a compression spring received in the receiving hole and provided with two ends thereof abutted against the ball and the end wall of the receiving hole, respectively. By this way, the elastic positioning member applies an elastic force to the pivot through the ball.

Preferably, the pivot has a shaft portion pivotally disposed in the pivot troughs of the support base and having the positioning recesses, and two disk portions connected with two ends of the shaft portion and located at the outside of the straight walls of the support wall and having diameters greater than a diameter of the shaft portion and diameters of the pivot troughs. The ball is elastically engaged with one of the positioning recesses of the pivot.

Preferably, the rotating base further includes a driving hole penetrating through the shaft portion. The rotating base can be driven to rotate by a driving shaft engaged with the shaft portion.

Other advantages and features of the present invention will be fully understood by reference to the following specification in conjunction with the accompanying drawings, in which like reference signs denote like components of structure.

DETAILED DESCRIPTION OF THE INVENTION

Figure 2:
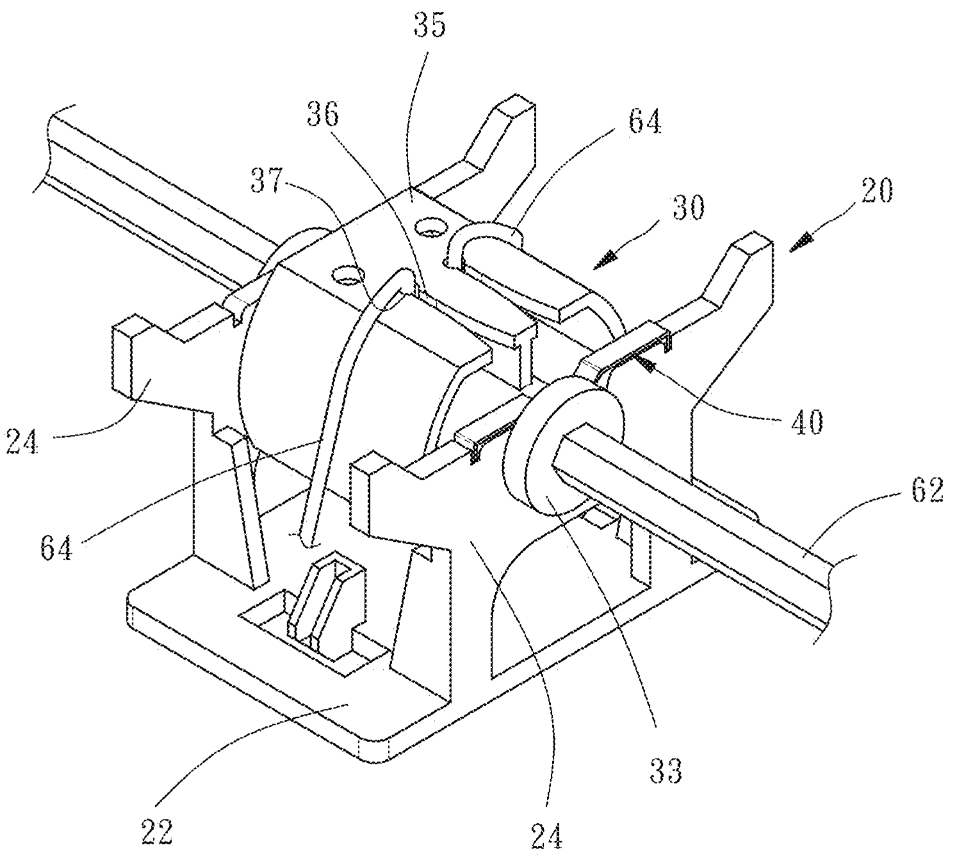
FIG. 2 is a perspective view of the ladder rope retaining device according to the first embodiment of the present invention.
Figure 3:
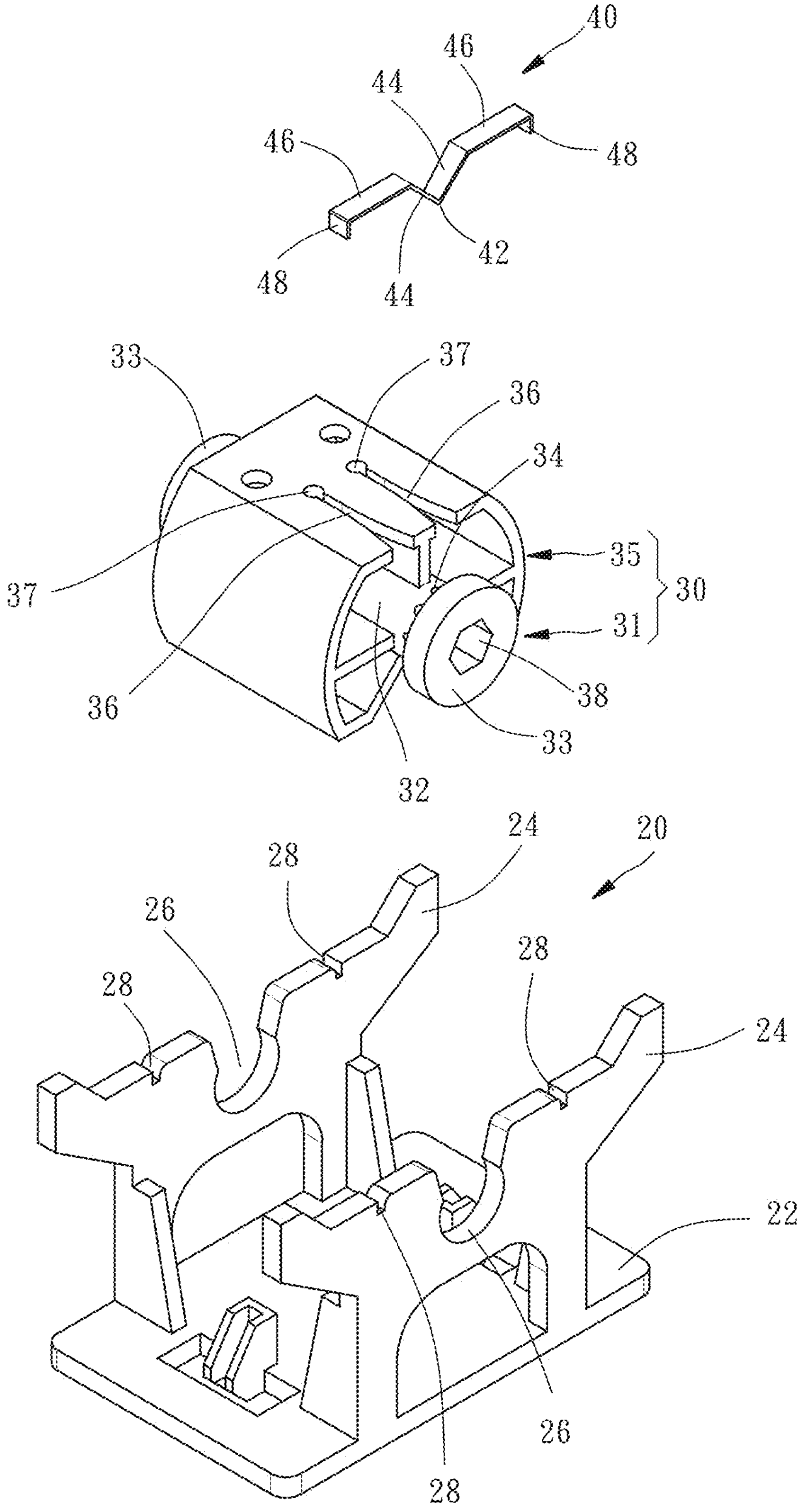
FIG. 3 is an exposed view of the ladder rope retaining device according to the first embodiment of the present invention.

Referring to FIGS. 2 and 3, a ladder rope retaining device 10 according to the first embodiment of the present invention comprises a support base 20, a rotating base 30, and an elastic positioning member 40.

Figure 1:
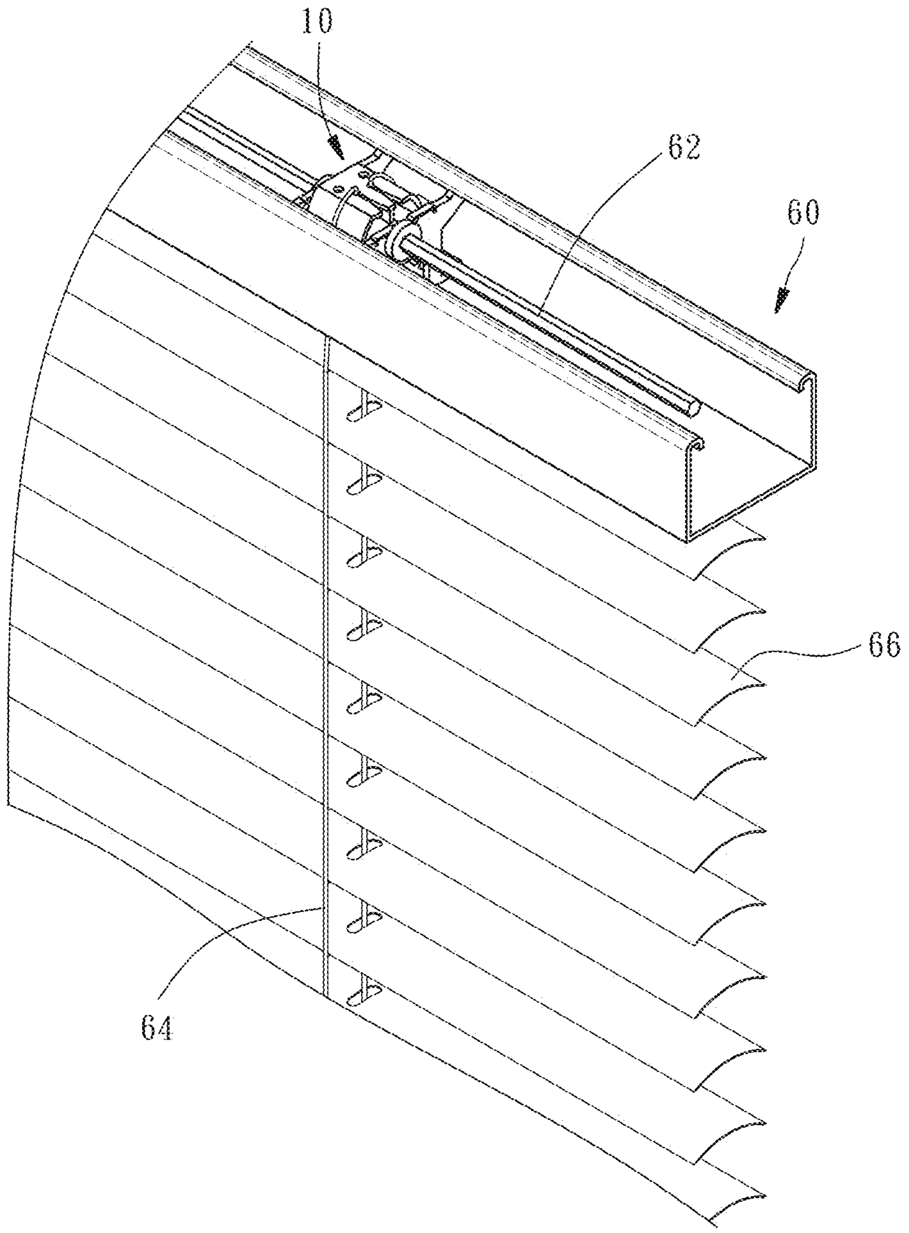
FIG. 1 is a partially perspective view of a venetian blind using a ladder rope retaining device according to a first embodiment of the present invention.

The support base 20 is assembled with a headrail 60 (as shown in FIG. 1). The support base 20 includes a bottom wall 22 and two straight walls 24. The straight walls 24 are integrally connected with two opposite sides of the bottom wall 22, and the straight walls 24 each have a pivot trough 26 with an opening facing upwards. The top edge of the straight walls 24 includes two insertion grooves 28 located at two opposite sides of the pivot troughs 26.

The rotating base 30 includes a pivot 31 and a ladder rope retaining portion 35. The pivot 31 has a shaft portion 32 and two disk portions 33. The outer surface of one end of the shaft portion 32 has a plurality of positioning recesses 34 arranged in an equally-spaced manner. The disk portions 33 are integrally connected with two ends of the shaft portion 32, and the disk portions 33 have diameters greater than the diameter of the shaft portion 32 and the diameter of the pivot trough 26. The ladder rope retaining portion 35 is integrally connected with the outer surface of the shaft portion 32, and the outer surface of the ladder rope retaining portion 35 has two slots 36. One end of each of the slots 36 is connected with a retaining hole 37, As shown in FIGS. 2 and 3, the two ends of the shaft portion 32 of the pivot 31 is assembled with the pivot troughs 26 of the support base 20 in such a way that the disk portions 33 is located at the outside of the straight walls 24 of the support base 20 for preventing the pivot 31 from separating from the pivot troughs 28 along its axial direction. In addition, the rotating base 30 further includes a driving hole 38 penetrating through the pivot 31. A driving shaft 62 is inserted into and engaged with the driving hole 38 for driving the rotating base 30 to rotate relative to the support base 20, When the rotating base 30 is used with two ladder ropes 64, the top ends of the ladder ropes 64 are inserted into the retaining holes 37 through the slots 36 and fastened to the rotating base 30 with knots, such that the ladder ropes 64 can be driven synchronously by the rotating base 30 to tilt the slats 66.

Figure 4:
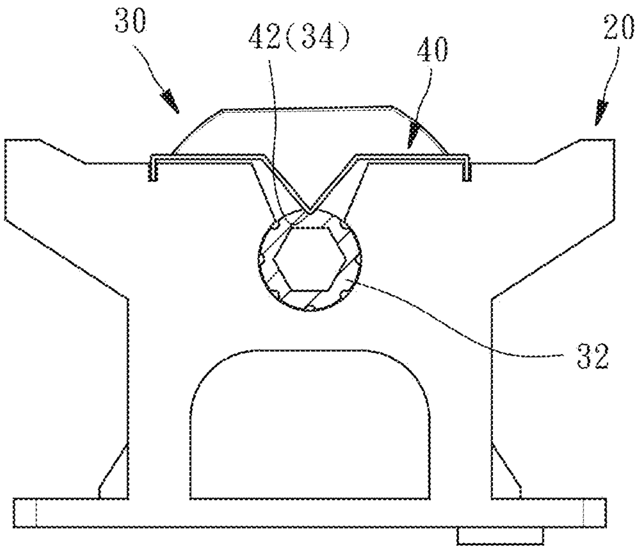
FIG. 4 is an end view of the ladder rope retaining device according to the first embodiment of the present invention, showing that the positioning portion of the elastic positioning member is engaged with one of the positioning recesses.

The elastic positioning member 40 is a metal sheet in this embodiment. The elastic positioning member 40 includes a positioning portion 42, two beveled portions 44, two extending portions 46, and two insertion portions 48. A first end of the beveled portions 44 is connected with the positioning portion 42, and a second end of the beveled portions 44 is connected with a first end of the extending portions 46. A second end of the extending portions 46 is connected with the insertion portions 48. As shown in FIGS. 3 and 4, the insertion portions 48 of the elastic positioning member 40 are inserted into the insertion grooves 28 of one of the straight walls 24 of the support base 30, such that the positioning portion 42 of the elastic positioning member 40 is elastically engaged with one of the positioning recesses 34 of the rotating base 30.

Figure 5:
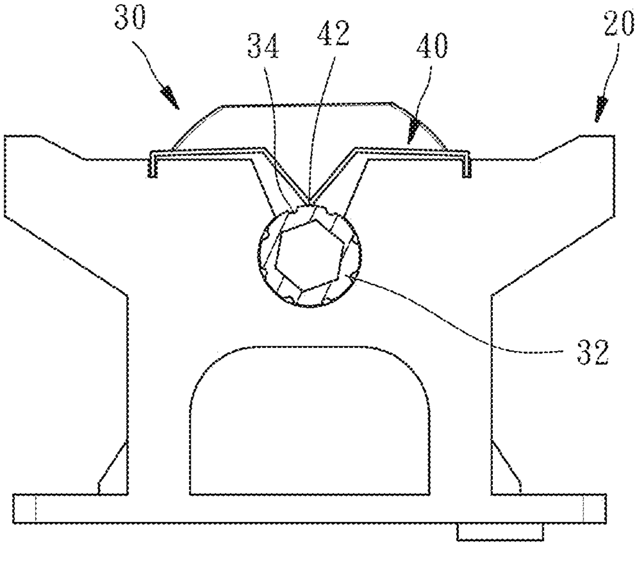
FIG. 5 is similar to FIG. 4, showing that the positioning portion of the elastic positioning member is disengaged from the positioning recesses.

It can be seen from the above that when the rotating base 30 is rotated relative to the support base 20, as shown in FIGS. 4 and 5, the positioning recesses 34 are alternately engaged with and disengaged from the positioning portion 42 of the elastic positioning member 40, such that the ladder rope retaining device 10 has a clear operating feel during rotation of the rotating base 30, thereby enhancing hand feel of a user during adjusting angle of the slats 66.

Figure 6:
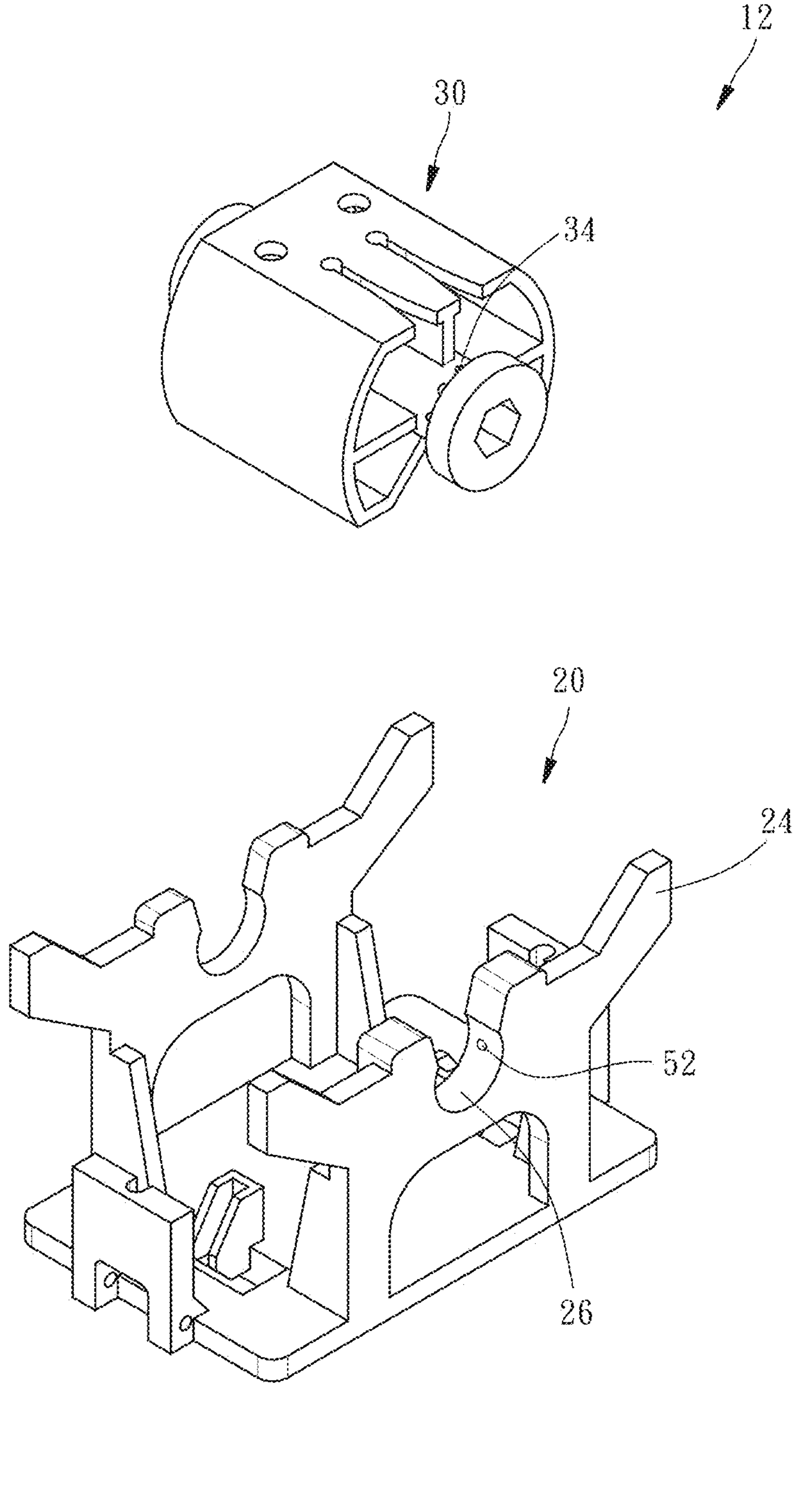
FIG. 6 is an exposed view of the ladder rope retaining device according to the second embodiment of the present invention.
Figure 7:
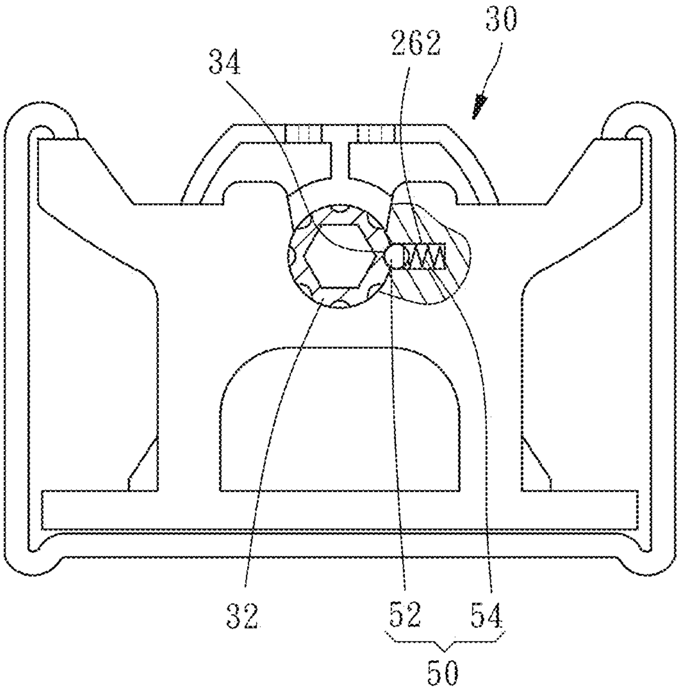
FIG. 7 is an end view of the ladder rope retaining device according to the second embodiment of the present invention, showing that the ball is engaged with one of the positioning recesses.
Figure 8:
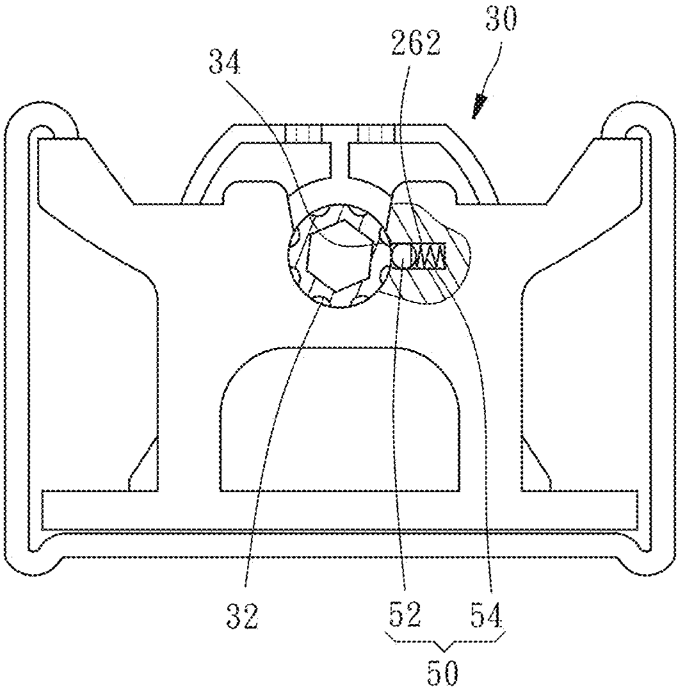
FIG. 8 is similar to FIG. 7, showing that the ball is disengaged from the positioning recesses.

As shown in FIGS. 6 to 8, the ladder rope retaining device 12 according to the second embodiment of the present invention is similar in structural to the aforesaid embodiment. In this embodiment, a receiving hole 262 is provided at the periphery wall of the pivot trough 26 of one straight wall 24 of the support base 20. The elastic positioning member 50 includes a ball 52 and a compression spring 54. The ball 52 has a part protruding out of the receiving hole 262 and engaged with one of the positioning recesses 34. The compression spring 54 is received in the receiving hole 262 and provided with two ends thereof abutted against the ball 52 and the end wall of the receiving hole 262, respectively. In this way, when the rotating base 30 is rotated relative to the support base 20, the positioning recesses 34 are alternately engaged with and disengaged from the ball 52, such that the ladder rope retaining device 12 has a clear operating feel during rotation of the rotating base 30, thereby enhancing hand feel of a user during adjusting angle of the slats 66.

What is claimed is:

1. A ladder rope retaining device for a venetian blind comprising:

a support base including a bottom wall and two straight walls connected with two opposite sides of the bottom wall and each having a pivot trough;

a rotating base including a pivot pivotally disposed in the pivot troughs of the support base and a ladder rope retaining portion disposed on an outer surface of the pivot, the outer surface of the pivot having a plurality of positioning recesses arranged in an equally-spaced manner; and an elastic positioning member disposed to one of the straight walls of the support base and elastically engaged with one of the positioning recesses of the pivot of the rotating base;

wherein the positioning recesses are arranged in an annular manner around an entire circumference of the pivot;

wherein a top edge of the one of the straight walls of the support base includes two insertion grooves located at two opposite sides of the pivot trough; the elastic positioning member has a positioning portion elastically engaged with the one of the positioning recesses, two beveled support portions each provided with a first end connected with the positioning portion, two extending portions each provided with a first end connected with a second end of a respective one of the beveled support portions, and two insertion portions each vertically connected with a second end of a respective one of the extending portions and detachably inserted into a respective one of the insertion grooves of the one of the straight walls of the support base;

wherein the positioning portion, the beveled support portions, and the insertion portions are all located below a bottom side of a respective one of the extending portions.

2. The ladder rope retaining device as claimed in claim 1, wherein the pivot has a shaft portion pivotally disposed in the pivot troughs of the support base and having the positioning recesses, and two disk portions connected with two ends of the shaft portion and located at an outside of the straight walls of the support wall and having diameters greater than a diameter of the shaft portion and diameters of the pivot troughs.

3. The ladder rope retaining device as claimed in claim 1, wherein the rotating base further includes a driving hole penetrating through the shaft portion.

4. The ladder rope retaining device as claimed in claim 1, wherein one of the straight walls of the support base includes a receiving hole; the elastic positioning member includes a ball partially protruding out of the receiving hole and engaged with one of the positioning recesses of the pivot, and a compression spring received in the receiving hole and provided with two ends thereof abutted against the ball and an end wall of the receiving hole, respectively.

5. The ladder rope retaining device as claimed in claim 4, wherein the pivot has a shaft portion pivotally disposed in the pivot troughs of the support base and having the positioning recesses, and two disk portions connected with two ends of the shaft portion and located at an outside of the straight walls of the support wall and having diameters greater than a diameter of the shaft portion and diameters of the pivot troughs.

6. The ladder rope retaining device as claimed in claim 4, wherein the rotating base further includes a driving hole penetrating through the shaft portion.

* * * * *